United States Patent
Sun et al.

(10) Patent No.: US 8,459,012 B2
(45) Date of Patent: Jun. 11, 2013

(54) METHOD FOR PURGING A DOSING SYSTEM

(75) Inventors: Jinhui Sun, Bloomington, IL (US); Shashank Mupparapu, Peoria, IL (US); Theodore J. Tarabulski, Chillcothe, IL (US); Paul W. Park, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 707 days.

(21) Appl. No.: 12/292,459

(22) Filed: Nov. 19, 2008

(65) Prior Publication Data

US 2010/0122521 A1    May 20, 2010

(51) Int. Cl.
*F01N 3/00* (2006.01)
*F01N 3/10* (2006.01)

(52) U.S. Cl.
USPC ............. 60/295; 60/274; 60/286; 60/301

(58) Field of Classification Search
USPC ............. 60/273, 274, 286, 289, 295, 301
See application file for complete search history.

(56) References Cited

U.S. PATENT DOCUMENTS

| | | |
|---|---|---|
| 4,987,738 A | 1/1991 | Lopez-Crevillen et al. |
| 5,522,218 A | 6/1996 | Lane et al. |
| 5,554,057 A | 9/1996 | Abe et al. |
| 5,809,775 A | 9/1998 | Tarabulski et al. |
| 5,884,475 A | 3/1999 | Hofmann et al. |
| 5,976,475 A | 11/1999 | Peter-Hoblyn et al. |
| 6,063,350 A | 5/2000 | Tarabulski et al. |
| 6,146,605 A | 11/2000 | Spokoyny |
| 6,279,603 B1 | 8/2001 | Czarnik et al. |
| 6,363,771 B1 | 4/2002 | Liang et al. |
| 6,415,602 B1 | 7/2002 | Patchett et al. |
| 6,427,439 B1 | 8/2002 | Xu et al. |
| 6,526,753 B1 | 3/2003 | Bailey |
| 6,546,720 B2 | 4/2003 | Van Nieuwstadt |
| 6,625,975 B1 | 9/2003 | Stahl et al. |
| 6,845,611 B2 | 1/2005 | Huthwohl et al. |
| 6,863,874 B1 | 3/2005 | Twigg |
| 6,871,490 B2 | 3/2005 | Liang et al. |
| 6,895,747 B2 | 5/2005 | Upadhyay et al. |
| 6,928,807 B2 | 8/2005 | Jacob et al. |
| 6,941,746 B2 | 9/2005 | Tarabulski et al. |
| 7,008,603 B2 | 3/2006 | Brooks et al. |
| 7,065,958 B2 | 6/2006 | Funk et al. |
| 7,200,990 B2 | 4/2007 | Gabrielsson et al. |

(Continued)

FOREIGN PATENT DOCUMENTS

| | | |
|---|---|---|
| CN | 101103184 | 1/2008 |
| DE | 10254981 A1 * | 6/2004 |

(Continued)

OTHER PUBLICATIONS

Funahashi, English Abstract of JP 2005-248823 A, Sep. 15, 2005.*

(Continued)

*Primary Examiner* — Kenneth Bomberg
*Assistant Examiner* — Audrey K. Bradley
(74) *Attorney, Agent, or Firm* — Finnegan, Henderson, Farabow, Garrett & Dunner LLP

(57) ABSTRACT

A method for purging reductant from a reductant supply system is disclosed. The method includes dispensing reductant into an exhaust system via a dispensing device. The method also includes purging the dispensing device by urging reductant from the dispensing device to a reductant source.

21 Claims, 7 Drawing Sheets

U.S. PATENT DOCUMENTS

| | | |
|---|---|---|
| 7,275,366 B2 | 10/2007 | Powell et al. |
| 7,337,607 B2 | 3/2008 | Hou et al. |
| 7,373,775 B2 | 5/2008 | Breuer et al. |
| 7,426,825 B2 | 9/2008 | Viola et al. |
| 2004/0124259 A1 | 7/2004 | Guezennec et al. |
| 2005/0056004 A1 | 3/2005 | Kakwani et al. |
| 2005/0069476 A1 | 3/2005 | Blakeman et al. |
| 2005/0207961 A1 | 9/2005 | Brooks et al. |
| 2005/0252201 A1 | 11/2005 | Lecea et al. |
| 2006/0086079 A1 | 4/2006 | Kaefer et al. |
| 2006/0086080 A1 | 4/2006 | Katogi et al. |
| 2006/0207243 A1 | 9/2006 | Roberts et al. |
| 2006/0213187 A1 | 9/2006 | Kupe et al. |
| 2006/0283173 A1 | 12/2006 | Zheng et al. |
| 2007/0036694 A1 | 2/2007 | Nishioka et al. |
| 2007/0044457 A1* | 3/2007 | Upadhyay et al. ............ 60/295 |
| 2007/0056264 A1 | 3/2007 | Hou et al. |
| 2007/0084193 A1 | 4/2007 | Levin |
| 2007/0157602 A1 | 7/2007 | Gschwind |
| 2007/0163238 A1 | 7/2007 | Gerlach |
| 2007/0163239 A1 | 7/2007 | Hofmann et al. |
| 2007/0180816 A1 | 8/2007 | Masuda et al. |
| 2007/0251226 A1 | 11/2007 | Kaneko |
| 2008/0014103 A1 | 1/2008 | Cooke |
| 2008/0016849 A1 | 1/2008 | McCarthy et al. |
| 2008/0022654 A1 | 1/2008 | Broderick et al. |
| 2008/0022659 A1 | 1/2008 | Viola et al. |
| 2008/0022660 A1 | 1/2008 | Reuter et al. |
| 2008/0022663 A1 | 1/2008 | Dodge et al. |
| 2008/0034733 A1 | 2/2008 | Miller et al. |
| 2008/0034734 A1 | 2/2008 | Karkkainen et al. |
| 2008/0035187 A1 | 2/2008 | Brown et al. |
| 2008/0066452 A1 | 3/2008 | Oberski et al. |
| 2008/0066453 A1 | 3/2008 | Oberski et al. |
| 2008/0087739 A1 | 4/2008 | Tarabulski et al. |
| 2008/0141661 A1 | 6/2008 | Voss et al. |
| 2008/0209895 A1 | 9/2008 | Miller et al. |
| 2008/0282681 A1* | 11/2008 | Katou et al. ............ 60/286 |
| 2009/0301064 A1* | 12/2009 | Maier et al. ............ 60/286 |

FOREIGN PATENT DOCUMENTS

| | | |
|---|---|---|
| EP | 0487886 A1 | 6/1992 |
| EP | 0615777 A1 | 9/1994 |
| EP | 0878608 A2 | 11/1998 |
| JP | 2005248823 A * | 9/2005 |
| JP | 2005248924 | 9/2005 |
| WO | WO 2006064028 A1 * | 6/2006 |
| WO | 2008001598 | 1/2008 |

OTHER PUBLICATIONS

Buerglin et al., English Abstract of DE 10254981 A1, Jun. 3, 2004.*
U.S. Appl. No. 11/806,355, filed on May 31, 2007.

* cited by examiner

METHOD FOR PURGING A DOSING SYSTEM

TECHNICAL FIELD

The present disclosure is directed to a urea dosing system and, more particularly, to a method for purging a urea dosing system.

BACKGROUND

Urea dosing systems are typically used to reduce $NO_x$ emissions in large machines where space and weight considerations are not a concern, such as, for example, locomotives and engine-generators. Urea is a reductant that is typically mixed with water and stored in a tank that is located on the machine. As the machine operates and produces exhaust, the urea mixture is pumped from the tank into the exhaust system. The urea mixture may be mixed with air and sprayed into the exhaust system via a nozzle. The urea mixture may react with exhaust fumes at high temperatures, affecting a selective catalytic reduction (SCR) reaction that may reduce $NO_x$ emissions of the machine. A shortcoming of dosing systems relates to the relatively high ambient temperatures at which urea mixtures freeze, such as about −11° C. (about 12° F.). The urea mixture may freeze and expand within the dosing system, causing damage to intricate components such as injector nozzles. Additionally, when heated to intermediate temperatures between about 100° and 250° C., urea may decompose into a urea byproduct that may clog dosing components and/or an exhaust system.

U.S. Patent Application Publication No. 2007/0180816 A1 (the '816 publication) by Masuda et al. discloses an exhaust emission purifying apparatus for an engine. The '816 publication discloses a urea storage tank that is connected to an exhaust system via a passage. Urea is injected into the exhaust system via a nozzle located on the passage. The '816 publication also discloses a discharge-forcing device that forcibly discharges urea gas, which collects in an upper portion of the storage tank, to the exhaust system.

Although the '816 publication may provide a method for discharging urea gas from the upper portion of a storage tank, it may fail to purge urea from a nozzle that sprays urea into an exhaust system and thereby fail to prevent damage from frozen urea. The system of the '816 publication may also fail to remove urea from dosing components and/or an exhaust system at temperatures between about 100° and 250° C., which may allow the urea to decompose into ammonia polymer and cause clogging.

The present disclosure is directed to overcoming one or more of the shortcomings set forth above and/or other deficiencies in the existing technology.

SUMMARY OF THE DISCLOSURE

In accordance with one aspect, the present disclosure is directed toward a method for purging reductant from a reductant supply system. The method includes dispensing reductant into an exhaust system via a dispensing device. The method also includes purging the dispensing device by urging reductant from the dispensing device to a reductant source.

According to another aspect, the present disclosure is directed toward an emissions reduction system. The emissions reduction system includes a dispensing device configured to dispense reductant into an exhaust system. The emissions reduction system also includes a pressurized fluid source connected to the dispensing device and configured to urge the reductant from the dispensing device to a reductant source.

DETAILED DESCRIPTION

Figure 1:
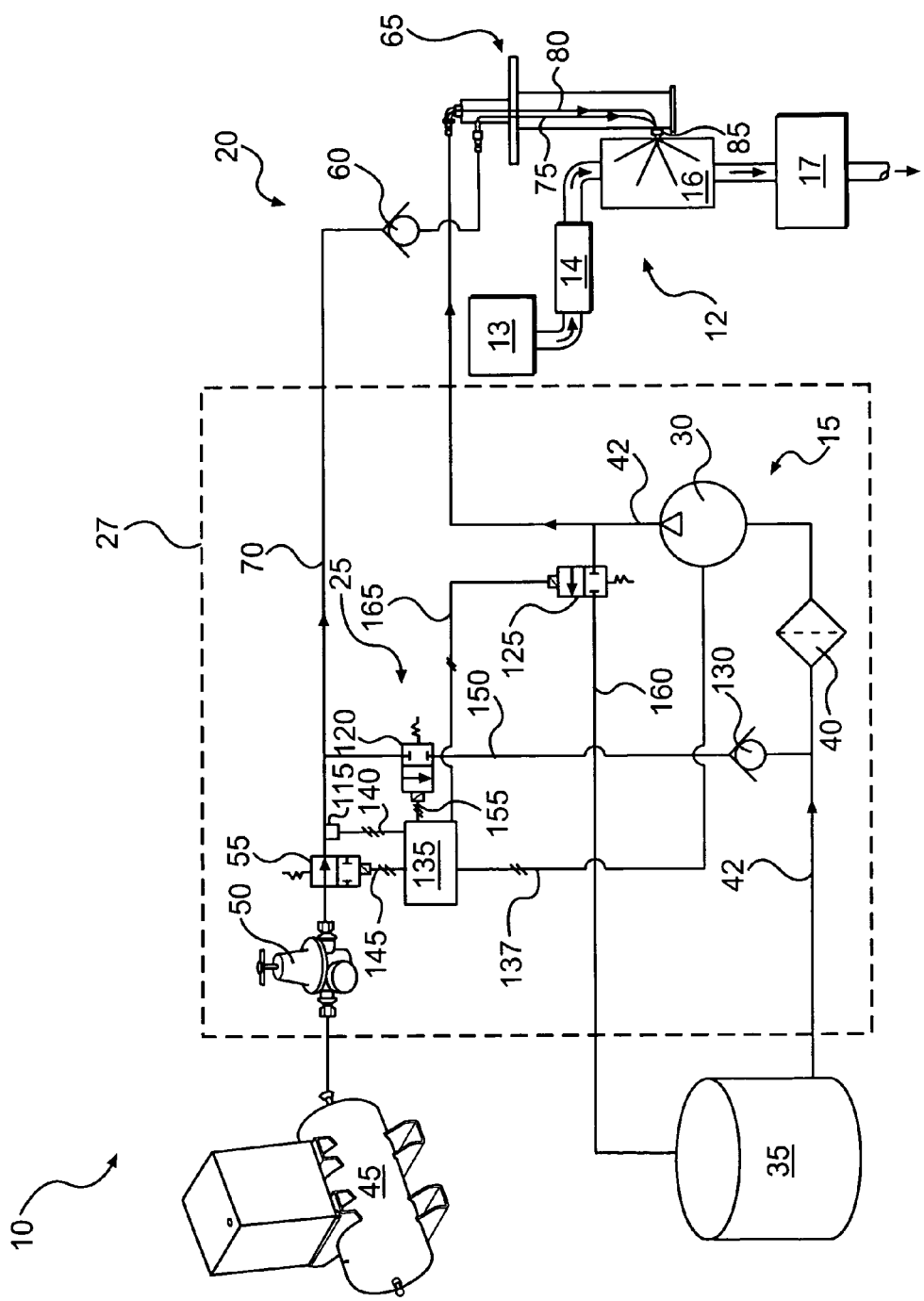
FIG. 1 is a schematic illustration of an exemplary disclosed dosing system.
Figure 2:
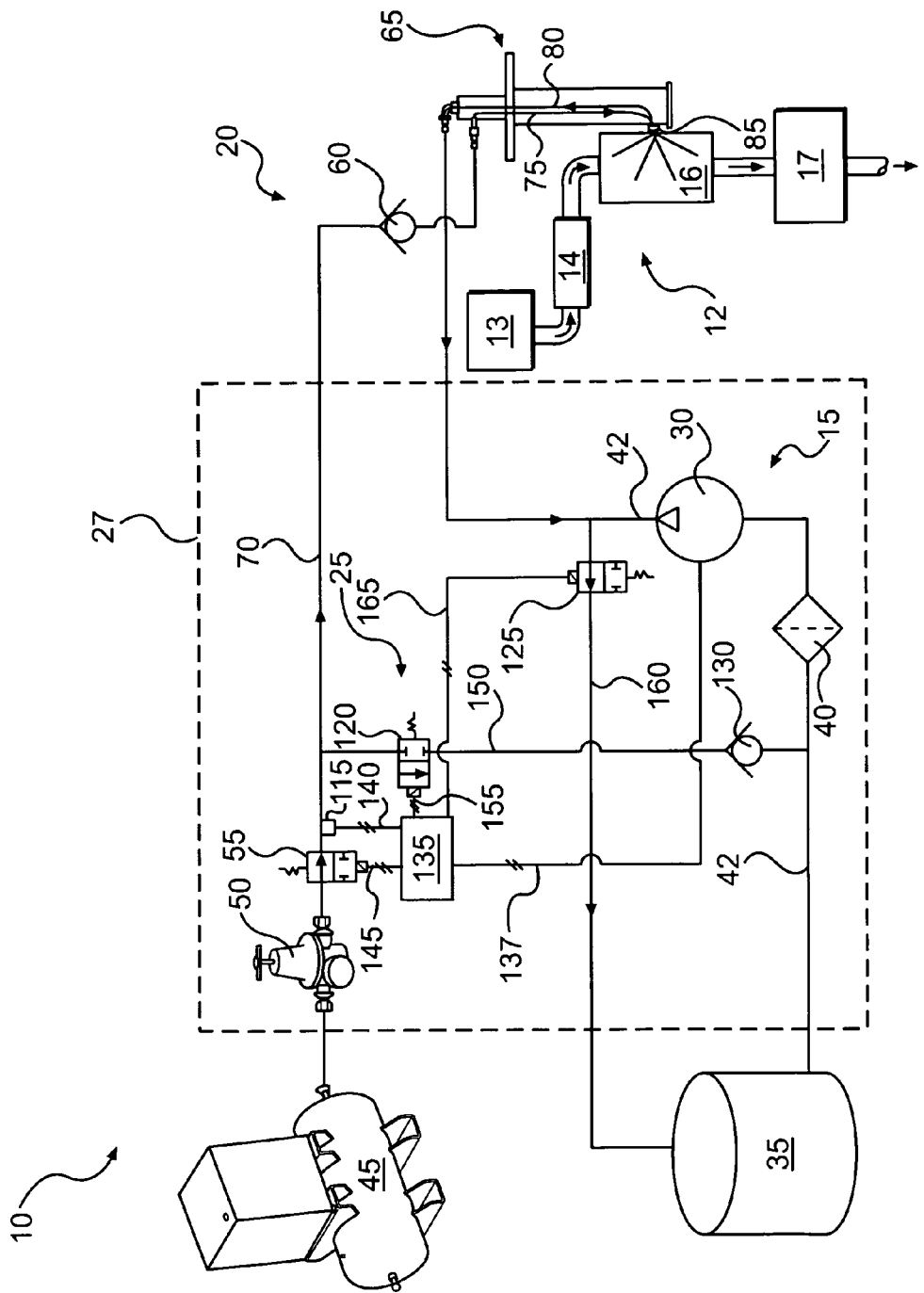
FIG. 2 is a second schematic illustration of the dosing system.
Figure 3:
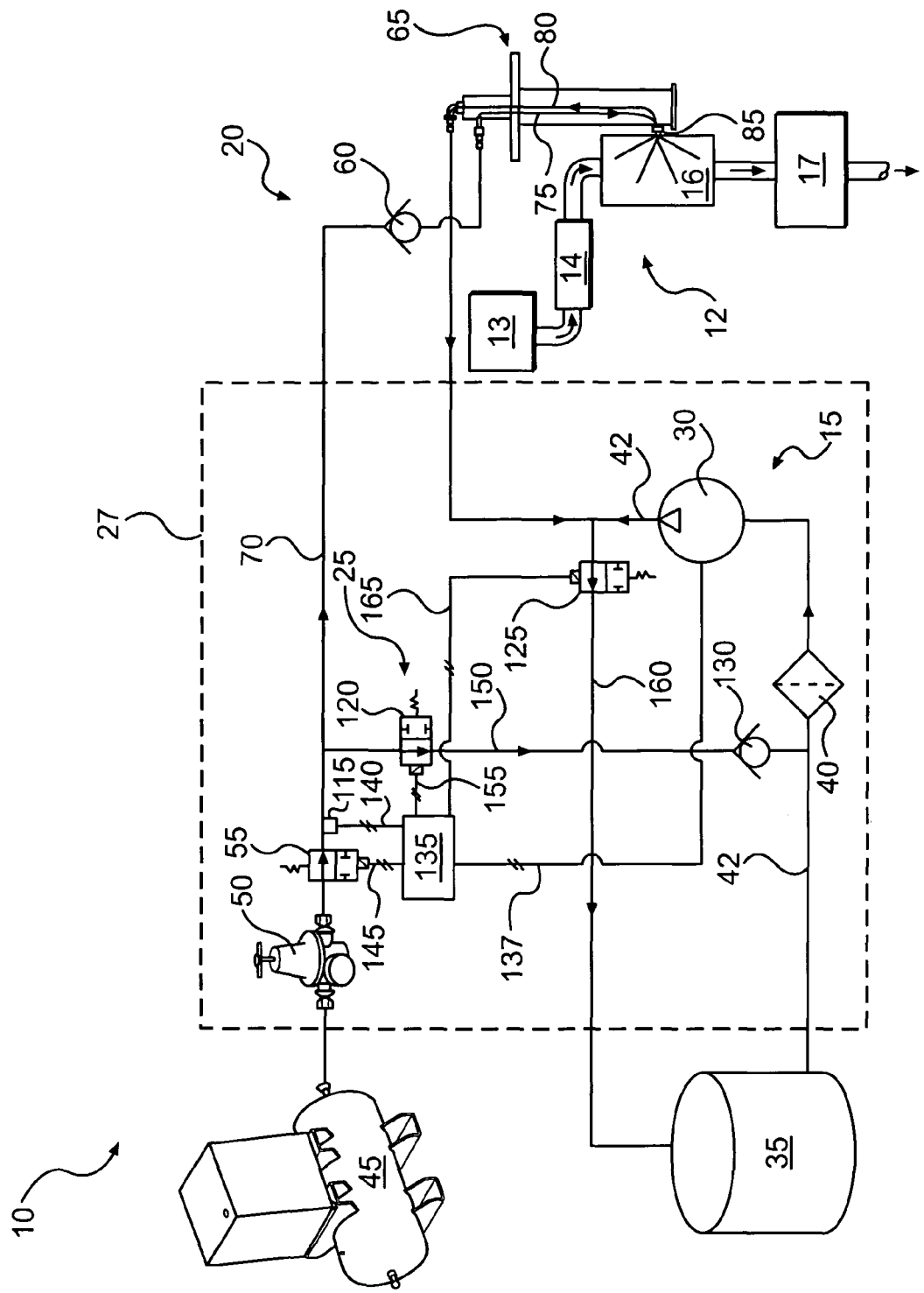
FIG. 3 is a third schematic illustration of the dosing system.

FIGS. 1, 2, and 3 illustrate an exemplary dosing system 10. Dosing system 10 introduces a reductant into an exhaust system 12 of a machine to affect a chemical reaction that reduces $NO_x$ emissions. Dosing system 10 may inject a reductant such as, for example, a urea solution into exhaust system 12 of a machine engine system to help affect selective catalytic reduction (SCR). The reductant may be a urea solution that is mixed with water. At temperatures higher than between about 180° C. and 250° C., the urea solution may react with $NO_x$ in exhaust system 12, thereby helping to reduce $NO_x$ emissions. Dosing system 10 may include exhaust system 12, a pumping system 15, a spraying system 20, and a purging system 25. Dosing system 10 may be located partially or wholly within a housing 27 such as, for example, a cabinet for holding dosing equipment.

Exhaust system 12 may include an engine 13, an oxidation catalyst system 14, a mixer assembly 16, and an SCR assembly 17. Exhaust gas may be emitted from engine 13 and flow into oxidation catalyst system 14, where the exhaust gas may be initially treated. The exhaust gas may then flow to mixer assembly 16, where dosing system 10 may inject the reductant into the exhaust gas. The exhaust gas may then flow to SCR assembly 17, where SCR occurs.

Pumping system 15 transfers reductant toward exhaust system 12. Pumping system 15 may include a dosing pump 30, a reductant source 35, and a filter 40. Pump 30 may generate fluid flow within a passage 42, which may be fluidly connected to reductant source 35 and filter 40. Pump 30 may be a metering pump such as, for example, a diaphragm pump. Pump 30 may be driven independently of the engine such as, for example, by an electric motor. Reductant source 35 may be a low pressure tank for storing a reductant solution such as, for example, a urea solution. Reductant source 35 may be remotely located from housing 27 and may include a heating source for thawing the reductant solution. Filter 40 may be any suitable filter or strainer for removing ice crystals and debris from a reductant solution such as, for example, a plastic filter. As pump 30 pumps the reductant solution from reductant source 35 toward exhaust system 12, via passage 42, a portion of the reductant solution may be frozen. The frozen portion may be collected upstream of pump 30 via filter 40.

Spraying system 20 injects the reductant solution into exhaust system 12. Spraying system 20 may include a pressurized source 45, a pressure regulator 50, a control valve 55, a check valve 60, and a dispensing device 65. Pressurized source 45, pressure regulator 50, control valve 55, check valve 60, and dispensing device 65 may be fluidly connected via a passage 70. Pressurized source 45 may be remotely located from housing 27 and may include a pump and/or a pressurized container containing a pressurized gas such as, for example, air. Pressurized source 45 may pressurize air within passage 70 and may transfer the pressurized air toward dispensing device 65.

Pressure regulator 50 may mechanically regulate an air pressure within passage 70. Pressure regulator 50 may maintain an appropriate upstream pressure near pressurized source 45 so that, after pressure losses, an appropriate pressure is maintained within dispensing device 65 for reductant injection. Control valve 55 may be any suitable valve such as, for example, a solenoid-actuated and spring-biased control valve that is movable between a first position and a second position. Control valve 55 may selectively allow flow through passage 70 in a first position and may selectively block flow through passage 70 in a second position. Check valve 60 may ensure a unidirectional flow in passage 70, from pressurized source 45 toward dispensing device 65. Check valve 60 may be any suitable valve such as, for example, a ball check valve.

Figure 4:
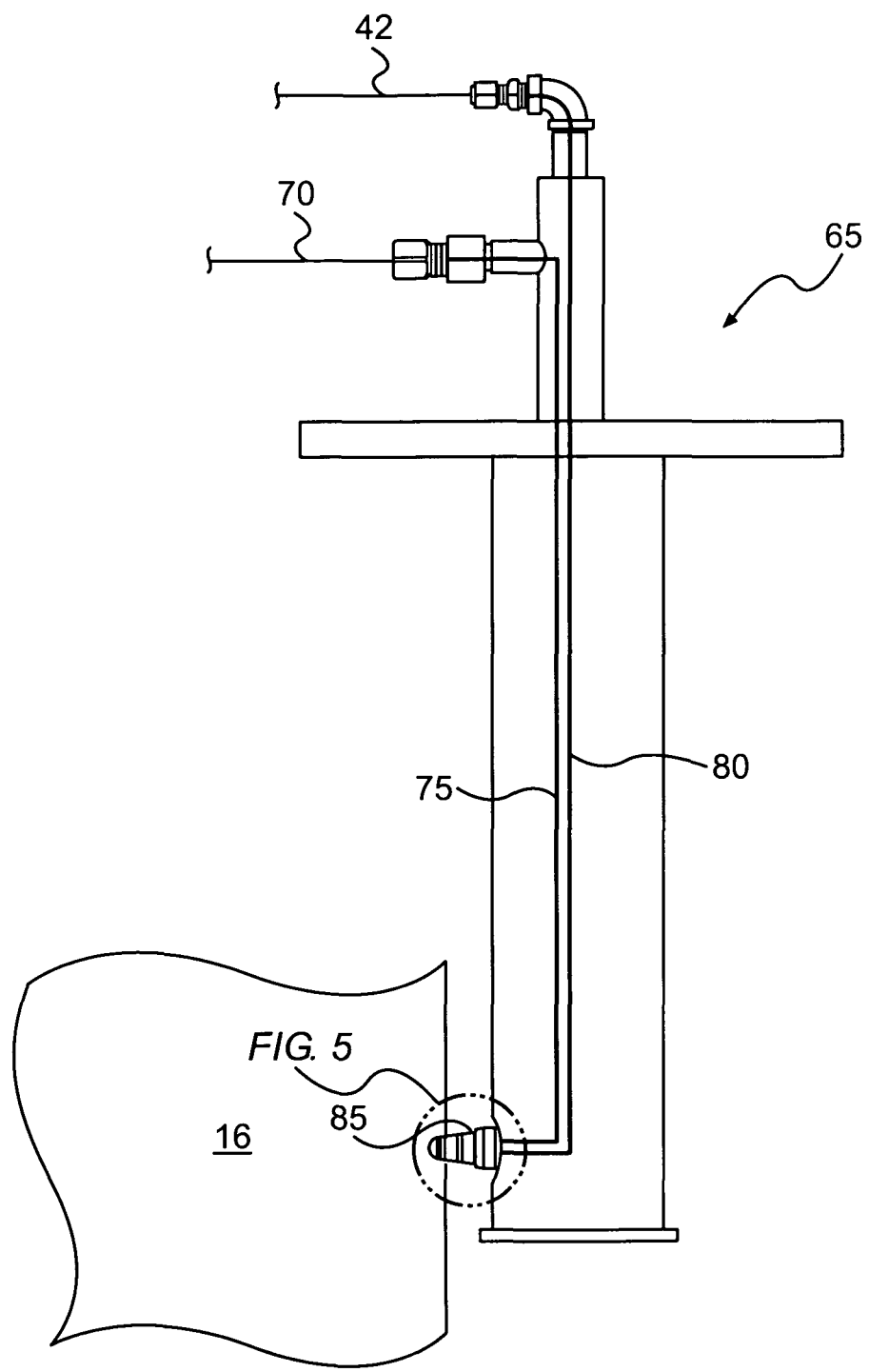
FIG. 4 is a schematic illustration of an exemplary disclosed dispensing device of the dosing system.

Dispensing device 65 introduces reductant into mixer assembly 16 of exhaust system 12. As illustrated in FIG. 4, dispensing device 65 may include a passage 75, a passage 80, and a nozzle 85. Passage 75 may be fluidly connected to passage 70 and may transfer pressurized air into nozzle 85. Passage 80 may be fluidly connected to passage 42 of pumping system 15 and may transfer reductant solution between passage 42 and nozzle 85.

Figure 5:
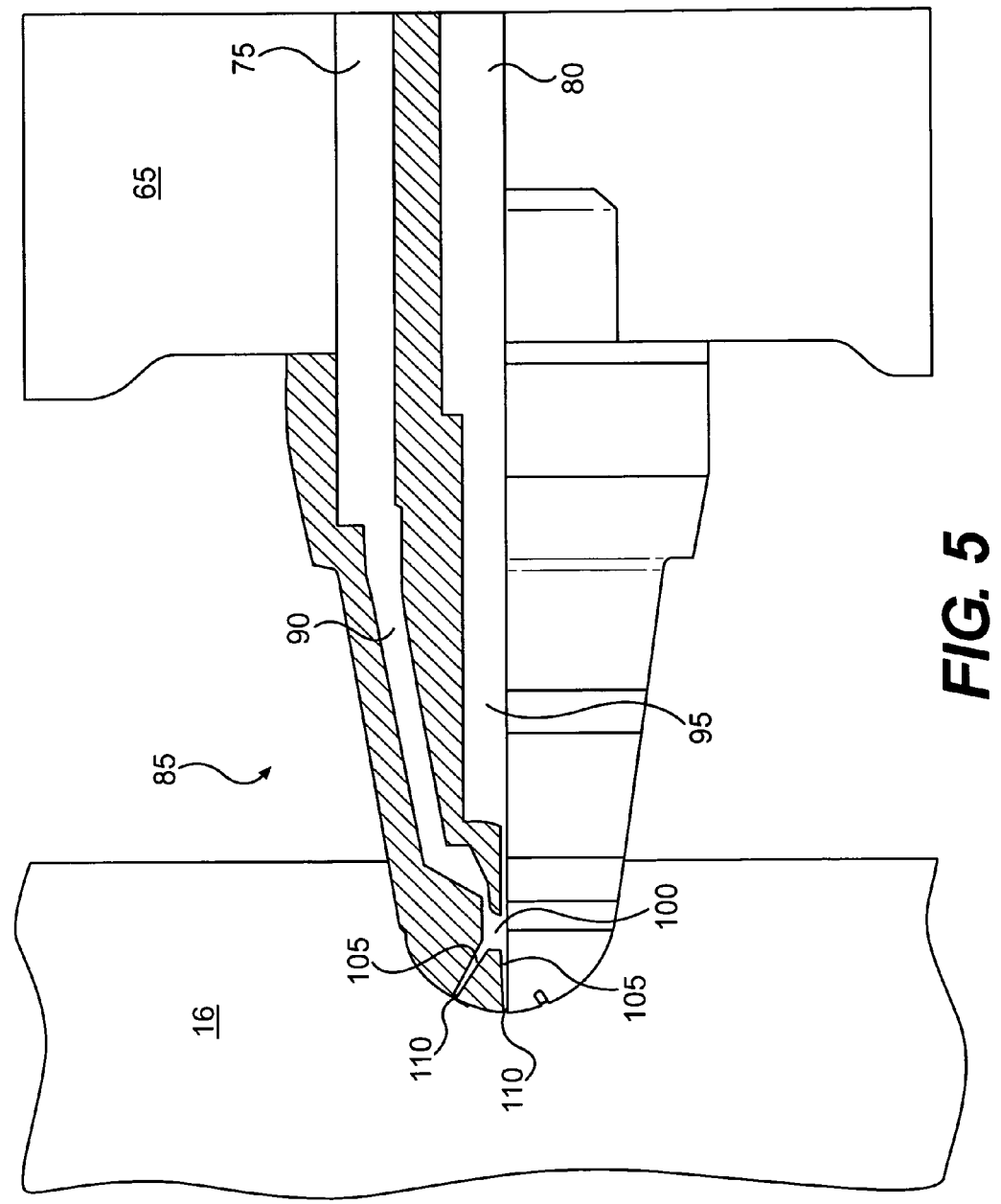
FIG. 5 is a cross section of an exemplary disclosed nozzle of the dispensing device of FIG. 4.

Nozzle 85 may be disposed within mixer assembly 16 of exhaust system 12 and injects reductant into exhaust system 12. As illustrated in FIG. 5, nozzle 85 may include a passage 90 that may be fluidly connected to passage 75 and a passage 95 that may be fluidly connected to passage 80. Passage 90 and passage 95 may be fluidly connected via a chamber 100. Passage 90 may transfer pressurized air into chamber 100 and passage 95 may transfer pressurized reductant solution into chamber 100, so that the flow of pressurized air and pressurized reductant may be combined in chamber 100. Chamber 100 may include a plurality of passageways 105 that may be fluidly connected to exhaust system 12 via a plurality of orifices 110. Orifices 110 may have relatively small areas that may form a pressure differential in dispensing device 65 and may provide a pressure restriction to flow. The pressurized air and the pressurized reductant may mix in chamber 100. The pressure of the mixture may overcome the restriction to flow through orifices 110 and spray into mixer assembly 16 of exhaust system 12.

Purging system 25 purges reductant from components of dosing system 10. Purging system 25 may include a sensor 115, a control valve 120, a control valve 125, a check valve 130, and a controller 135. Controller 135 may be any type of programmable logic controller known in the art for automating machine processes such as, for example, an engine control unit (ECU). Controller 135 may control an operation of pump 30 via an electrical line 137. Controller 135 may also be connected to other components of the machine such as, for example, the engine, an operator station, and the exhaust system. For example, controller 135 may be electrically connected to a temperature sensor disposed within exhaust system 12.

Sensor 115 may be disposed within passage 70 and may be any suitable sensor for measuring an air pressure. Sensor 115 may be electrically connected to controller 135 via an electrical line 140 and may provide values indicative of an air pressure in passage 70 to controller 135 as input. When sensor 115 reports air pressure values that are unsuitable for an operation of dosing system 10, controller 135 may control, via an electrical line 145, control valve 55 to move from the first position to the second position, thereby blocking air flow through passage 70.

Control valve 120 and check valve 130 may be fluidly connected via a passage 150 that may fluidly connect passage 70 and passage 42. Control valve 120 may be similar to control valve 55 and may selectively allow and block pressurized air flow through passage 150. Control valve 120 may be controlled by controller 135, via electrical line 155. Check valve 130 may be similar to check valve 60 and may ensure a unidirectional flow through passage 150, from pressurized source 45 toward an inlet of pump 30.

Control valve 125 may be similar to control valves 55 and 120 and may selectively allow and block flow through a passage 160. Control valve 125 may be controlled by controller 135, via electrical line 165. Passage 160 may fluidly connect an outlet of pump 30 and reductant source 35. Passage 160 may be sized larger than passage 42, so as to require less pressure for generating flow.

Figure 6:
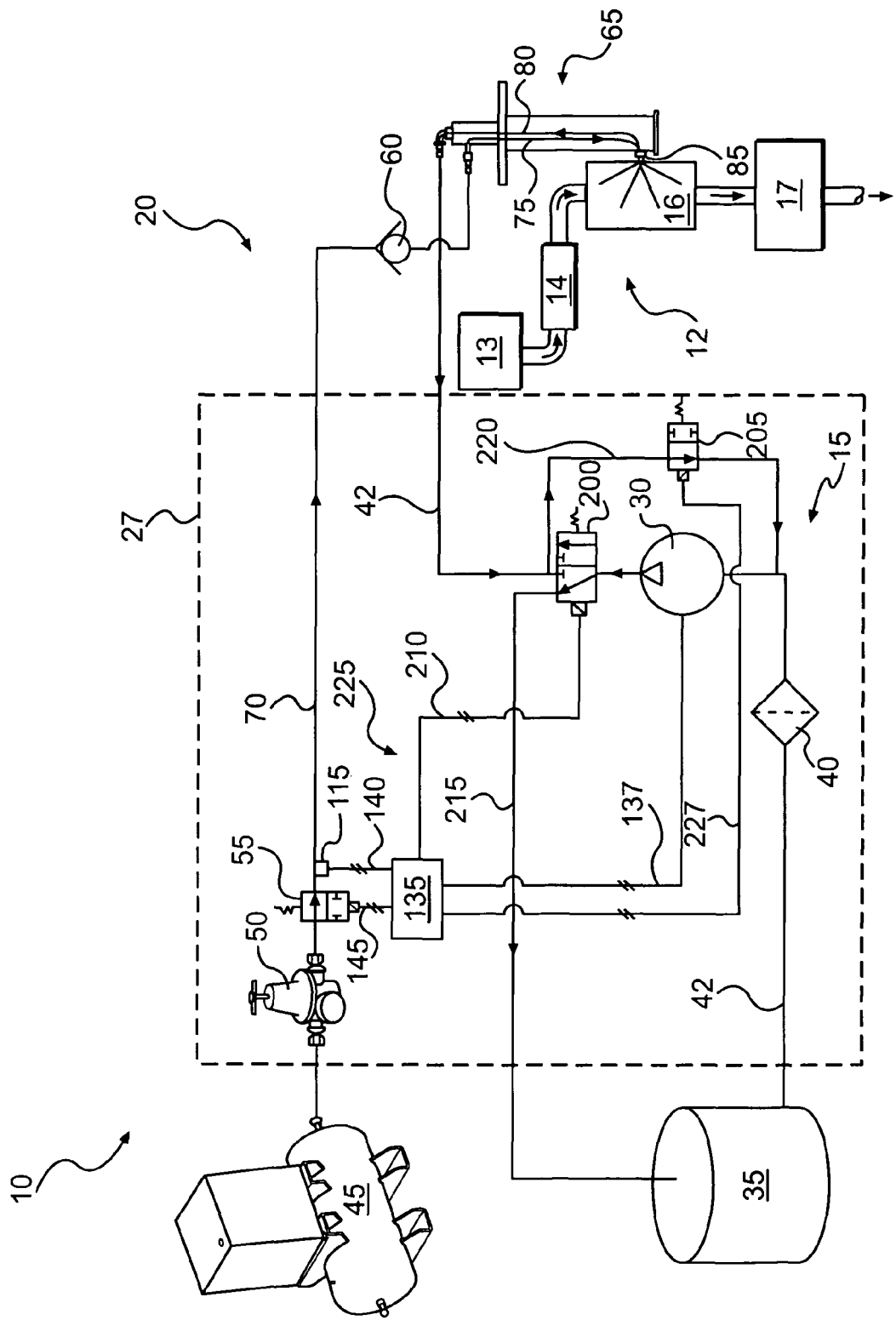
FIG. 6 is a schematic illustration of an alternative embodiment of the dosing system.

FIG. 6 illustrates dosing system 10 having an alternative purging system 225. Purging system 225 may be similar to purging system 25, but with the valves being alternatively disposed. Purging system 225 may include sensor 115 and controller 135, described above. Purging system 225 may also include a control valve 200 and a control valve 205. Control valve 200 may be similar to control valve 55 and may be controlled by controller 135, via an electrical line 210, to move between a first position and a second position. In the first position, control valve 200 may fluidly connect an outlet of pump 30 and dispensing device 65. In the second position (as illustrated in FIG. 6), control valve 200 may fluidly connect the outlet of pump 30 and reductant source 35, via a passage 215. It is also contemplated that control valves 200 and 205 may be integrated into a single valve.

A passage 220 may be a bypass passage fluidly connecting the outlet of pump 30 to the inlet of pump 30. Control valve 205 may be similar to control valve 200 and may selectively allow and block flow through passage 220. Control valve 205 may be controlled by controller 135 via an electrical line 227.

INDUSTRIAL APPLICABILITY

The disclosed dosing system may be used in any system that delivers fluid to an exhaust system to reduce exhaust emissions such as, for example, a locomotive or a generator. The disclosed dosing system may be used to affect selective catalytic reduction within any machine having an exhaust system.

Figure 7:
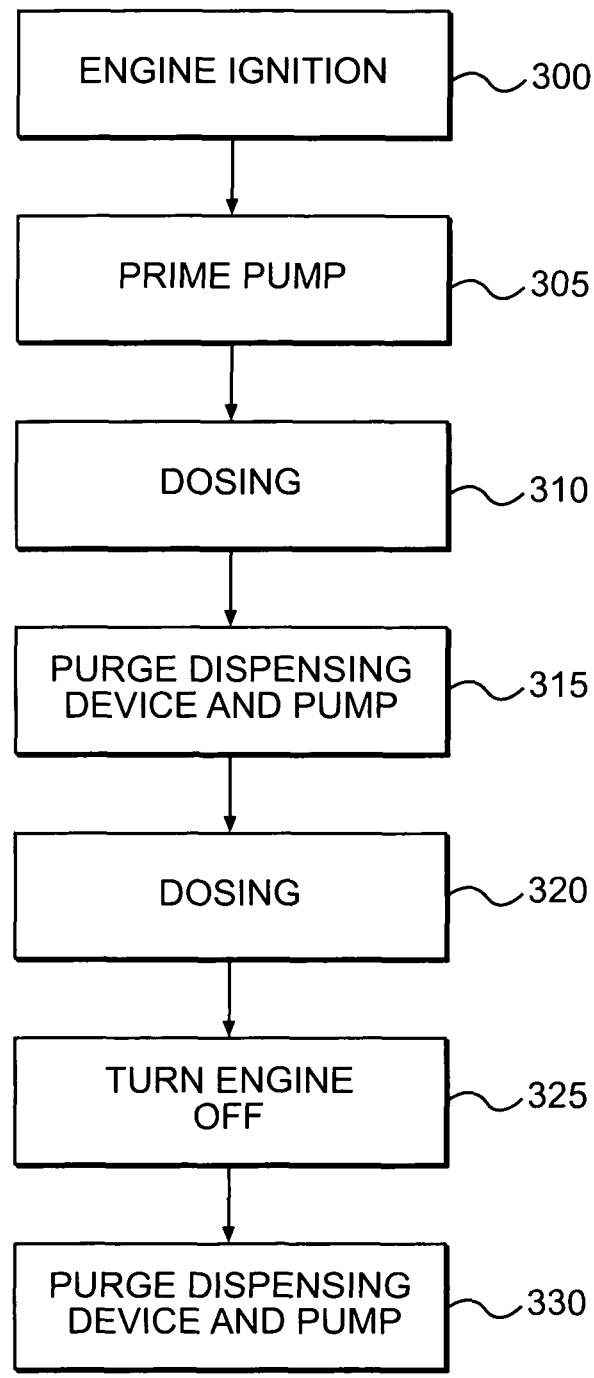
FIG. 7 is a flow chart for an exemplary disclosed dosing method.

FIG. 7 provides a method for operating dosing system 10. Engine ignition occurs in step 300. In step 305, pump 30 is primed. Controller 135 commands control valve 125 to move to a position allowing flow through passage 160. Pump 30 is primed by pressurizing reductant into passage 160. After pump 30 has been primed, control valve 125 moves to a position blocking flow through passage 160. After pump 30 has been primed, controller 135 commands control valve 55 to move to a position allowing a flow of pressurized air through passage 70. Control valve 55 may remain in this position for the remaining method steps.

Dosing occurs in step 310. Dosing may occur when a temperature within exhaust system 12 exceeds a threshold temperature and selective catalytic reduction may be performed such as, for example, about 180° C. and above. When the exhaust temperature exceeds the threshold temperature, a temperature sensor disposed in the exhaust system signals controller 135. As illustrated in FIG. 1, pump 30 pressurizes reductant in passage 42 and pumps the reductant toward dispensing device 65. Control valve 55 may be in a position allowing flow through passage 70, allowing pressurized source 45 to urge pressurized air toward dispensing device 65. Control valves 120 and 125 may be in positions blocking flow through passages 150 and 160, respectively. As illustrated in FIG. 4, pressurized air and pressurized reductant enters dispensing device 65 via passages 75 and 80, respectively, and flows toward nozzle 85. As illustrated in FIG. 5, pressurized air and pressurized reductant flow via passages 90 and 95, respectively, and mix in chamber 100. The pressure of the air and reductant within chamber 100 may exceed the pressure restriction of orifices 110, causing the mixture of reductant and air to spray into exhaust system 12 via orifices 110.

Purging of reductant from dispensing device 65 and pump 30 occurs in step 315. Dosing may be stopped and purging may begin when a temperature within exhaust system 12, reported to controller 135 via the temperature sensor, falls below a threshold temperature such as, for example, between about 180° C. and about 250° C. For example, the threshold temperature may be about 180° C. The engine may remain on at this time and may be idling. Once the purging of step 315 begins, controller 135 may prevent the engine from being turned off until the purging process is complete. Alternatively, the engine may be fully shut down, and thereafter the purging of step 315 may be initiated.

As illustrated in FIG. 2, dispensing device 65 is purged when control valve 55 is in a position allowing flow through passage 70 and control valve 125 is in a position allowing flow through passage 160. Control valve 120 may be in a position blocking flow through passage 150 and pump 30 may be turned off. Pressurized air from pressurized source 45 is transferred into dispensing device 65 via passages 70 and 75 and enters nozzle 85 via passage 90. Pressurized air then enters chamber 100. Because pump 30 is not operating at this time, passage 95 offers less resistance to flow than the pressure restriction of orifices 110. Pressurized air thus flows into passage 95 and flows out of dispensing device 65 via passage 80. The flow of pressurized air will then urge the remaining reductant out of dispensing device 65. The mixture of reductant and pressurized air is urged through passage 160 and returned to reductant source 35. Reductant is thereby purged from dispensing device 65 to reductant source 35 in a direction that is opposite to a direction of reductant flow during dosing.

As illustrated in FIG. 3, dispensing device 65 and pump 30 is purged when control valves 55, 120, and 125 are in positions allowing flow through passages 70, 150, and 160, respectively. Pump 30 may be turned off. As described above, pressurized air purges reductant from dispensing device 65 into reductant source 35. Pressurized air also flows from pressurized source 45, toward the inlet of pump 30, via passage 150. Pressurized air urges the reductant remaining in pump 30 between the pump inlet and outlet out of pump 30. The mixture of reductant and pressurized air exiting pump 30 is then urged through passage 160 and returned to reductant source 35. It is contemplated that as an alternative to providing control valve 120 and passage 150 for purging of pump 30, pump 30 may be provided with freeze-protection such as, for example, a heating device.

As illustrated in the alternative dosing system 10 of FIG. 6, dispensing device 65 and pump 30 may also be purged via purging system 225. Control valve 200 may be in the second position, fluidly connecting the outlet of pump 30 to reductant source 35 via passage 215. Control valve 205 may be in a position allowing flow through passage 220. Dispensing device 65 is purged as described above and shown in FIG. 5. The purging mixture of pressurized air and reductant from dispensing device 65 then flows toward the inlet of pump 30 via passage 220 and through pump 30. Once the purging mixture exits the outlet of pump 30, the mixture is returned to reductant source 35 via passage 215.

If the temperature within exhaust system 12 exceeds the threshold temperature, purging is stopped and dosing may begin again in step 320. The dosing of step 320 is similar to step 310. Steps 315 and 320 may be repeated as required, based on the temperature within exhaust system 12. The engine may be turned off by an operator and/or controller 135 in step 325. In step 330, dispensing device 65 and pump 30 may be purged in a manner similar to step 315.

Dosing system 10 may be used to purge reductant from dosing components to prevent damage and/or clogging. Dosing system 10 may purge reductant out of dispensing device 65 and toward reductant source 35. Reductant may thereby be removed to prevent damage to dosing components and/or the exhaust system from expansion of frozen reductant. Dosing system 10 may also purge reductant to avoid formation of polymer and the resulting clogging that may occur in nozzle 85 and exhaust system 12. Because dosing system 10 may purge reductant back to reductant source 35, instead of into exhaust system 12, release of the reductant into the environment may be substantially reduced. Release of offensive-smelling odor into the environment may thereby be significantly reduced.

It will be apparent to those skilled in the art that various modifications and variations can be made to the disclosed dosing system. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. An emissions reduction system, comprising:
   an injector configured to dispense reductant into an exhaust system;
   a pump configured to provide the reductant to the injector through a first passageway; and
   a pressurized fluid tank fluidly connected to the injector through a second passageway and configured to urge a purge flow including the reductant combined with a pressurized fluid from the injector, through the pump, and to a reductant source,
   wherein the second passageway joins the first passageway at the injector.

2. The emissions reduction system of claim 1, wherein the pressurized fluid is pressurized air.

3. The emissions reduction system of claim 1, further including a valve located in the first passageway, the valve configured to selectively divert flow from the first passageway to a third passageway connected to the reductant source.

4. The emissions reduction system of claim 1, further including a valve located in the second passageway and configured to selectively block flow through the second passageway.

5. The emissions reduction system of claim 1, wherein the injector includes a nozzle configured to inject the reductant.

6. The emissions reduction system of claim 5, wherein the nozzle includes a chamber near its distal end configured to allow introduction of the pressurized fluid into the reductant to create the purge flow.

7. The emissions reduction system of claim 1, further including a bypass passage around the pump.

8. The emissions reduction system of claim 7, wherein the bypass passage includes a valve located therein to selectively block flow through the bypass passage.

9. The emissions reduction system of claim 8, further including a controller in communication with and configured to control the valve located in the bypass passage.

10. The emissions reduction system of claim 9, wherein the reductant is urea.

11. A method for purging reductant from a reductant supply system, comprising:
dispensing reductant into an exhaust system with a pump configured to drive the reductant through an injector, the injector having:
a fluid receiving end, and
a fluid injecting end for injecting the reductant;
purging the injector by urging the reductant from the injector to a reductant source using a pressurized gas that mixes with the reductant at the injector to form a purge flow, wherein the pressurized gas enters the injector through the fluid receiving end prior to mixing with the reductant; and
purging the pump with the purge flow from the injector.

12. The method of claim 11, wherein the reductant is a urea solution.

13. The method of claim 11, wherein the purge flow is restricted from exiting into the exhaust system by a pressure differential formed in the injector.

14. The method of claim 11, wherein dispensing reductant occurs when a temperature of the exhaust system is higher than about 180° C. and purging the injector occurs when the temperature of the exhaust system is less than about 180° C.

15. The method of claim 11, further comprising blocking flow from entering an outlet of the pump.

16. The method of claim 11, wherein the pressurized gas is pressurized air.

17. A method for purging reductant from a reductant supply system, comprising:
providing a flow of supply reductant in a first direction through a passage of a dispensing device of the supply system;
providing a flow of pressurized air to the dispensing device to purge reductant from the dispensing device in a second direction through the passage, the second direction being opposite to the first direction; and
directing the flow of purged reductant from the dispensing device to an inlet of a pump that provides the flow of supply reductant, and then through the pump to an outlet of the pump, and directing the flow of purged reductant to a reductant source,
wherein directing the flow of purged reductant from the dispensing device to the inlet of the pump includes blocking the flow of purged reductant to the outlet of the pump and directing the flow of purged reductant to the inlet of the pump by a bypass passage.

18. The method of claim 17, further including blocking the bypass passage when providing flow of supply reductant.

19. The method of claim 17, wherein the supply reductant is a urea solution.

20. The method of claim 17, wherein providing the flow of supply reductant occurs when a temperature of an exhaust system associated with the supply system is higher than about 180° C. and providing the flow of pressurized air occurs when the temperature of the exhaust system is less than about 180° C.

21. The method of claim 17, wherein the flow of pressurized air is provided from a pressurized tank.

* * * * *

UNITED STATES PATENT AND TRADEMARK OFFICE
CERTIFICATE OF CORRECTION

| | | |
|---|---|---|
| PATENT NO. | : 8,459,012 B2 | Page 1 of 1 |
| APPLICATION NO. | : 12/292459 | |
| DATED | : June 11, 2013 | |
| INVENTOR(S) | : Sun et al. | |

It is certified that error appears in the above-identified patent and that said Letters Patent is hereby corrected as shown below:

On the Title Page, Column 1, Item 75 (Inventors), line 3, delete "Chillcothe, IL" and insert -- Chillicothe, IL --.

In the Specification

Column 4, lines 42-44, delete ".........may be controlled by controller 135 via an electrical line 227.
INDUSTRIAL APPLICABILITY
The disclosed dosing system may be used in any system........." and insert -- .........may be controlled by controller 135 via an electrical line 227.

INDUSTRIAL APPLICABILITY

The disclosed dosing system may be used in any system......... --.

In the Claims

Column 7, line 20, in Claim 11, delete "flow,wherein" and insert -- flow, wherein --.

Signed and Sealed this
Twenty-fifth Day of August, 2015

Michelle K. Lee
*Director of the United States Patent and Trademark Office*